Dec. 26, 1967 R. DERC 3,360,782

SEQUENCE CHECKING SYSTEM

Filed Nov. 23, 1964 4 Sheets-Sheet 1

Dec. 26, 1967 R. DERC 3,360,782

SEQUENCE CHECKING SYSTEM

Filed Nov. 23, 1964 4 Sheets-Sheet 3

Dec. 26, 1967 R. DERC 3,360,782

SEQUENCE CHECKING SYSTEM

Filed Nov. 23, 1964 4 Sheets-Sheet 4

United States Patent Office 3,360,782

Patented Dec. 26, 1967

3,360,782

SEQUENCE CHECKING SYSTEM

Roman Derc, Kidsgrove, Stoke-on-Trent, England, assignor to English Electric-Leo Computers Limited, London, England, a British company Filed Nov. 23, 1964, Ser. No. 412,916

Claims priority, application Great Britain, Nov. 26, 1963, 46,640/63

4 Claims. (Cl. 340—172.5)

ABSTRACT OF THE DISCLOSURE

This invention relates to data printers, e.g. of the type with a constantly rotating drum on which there are say 160 similar circumferential bands each of which has say 64 different characters provided thereon in raised form. A row of 160 hammers is placed adjacent to the drum, and by firing a hammer towards the drum, a character is printed on a sheet of paper which together with a printing ribbon is passed between the drum and the hammers. The particular character printed depends on which character on the drum is opposite the hammer at the moment of firing. The printer also includes a buffer memory which is filled initially with the line of characters to be printed and is read out in character order. Various arrangements have been proposed for checking the operation of such printers. The present invention provides an improved checking arrangement in which for each hammer there is a single flip-flop which is used to fully check the writing of information into the buffer memory, the reading of information from the buffer memory and the firing of the hammers.

The invention relates to a system for checking the correct functioning of a sequence of operations and is applicable, for example, to such checking in a high speed line printer for use with data processing equipment.

According to the invention, such a system comprises a bistable device capable of being set in a first state and a second state and of being triggered from each state to the other state, first means activated by completion of one operation in the sequence for setting the bistable device into the first state, second means activated by completion of a further operation in the sequence for triggering the bistable device, and third means for sensing the state of the bistable device so as to determine whether the two operations have been completed.

An embodiment of the invention, for checking the correct functioning of a plurality of sequences of operations, includes a plurality of said bistable devices, each associated with a respective one of the sequences, a like plurality of said first means each activated by completion of one operation in a respective one of the sequences for setting the bistable device associated with that sequence into the first state, and a like plurality of said second means each activated by completion of a further operation in a respective one of the sequences for triggering the bistable device associated with that sequence, the said third means being arranged to sense the states of all the bistable devices so as to determine whether both said operations in all the sequences have been completed.

Advantageously, the system includes fourth means for setting a said bistable device to a particular one of the states in response to a first type of fault causing occurrence of an operation during a predetermined period of time in the associated sequence when the operation would not occur in the absence of the first type of fault, and fifth means, for detecting the said first type of fault, activated during the said predetermined period of time for determining whether any of the bistable devices have been set to the said particular one of the states during the said predetermined period of time.

Advantageously, the system includes sixth means, operative in response to a second type of fault preventing a said bistable device from being set into the said first state by the said first means, for producing a signal indicating occurrence of the said second type of fault.

Preferably, the sixth means includes a further bistable device capable of being set alternately in each of two states, seventh means for supplying to the further bistable device at a predetermined time in each sequence of operations earlier than the time of completion of the said one operation in the sequence a signal for setting the further bistable device in one of its states, eighth means, responsive to the setting of each first mentioned bistable device into its said first state in response to activation of the first means, for setting the further bistable device into the other of its states, and ninth means operative at a predetermined time in each sequence later than the time of completion of the said one operation for sensing the state of the further bistable device and for producing a signal indicating occurrence of a said second type of fault, if the further bistable device is in the said other of its states.

The eighth means may include an OR gate having a plurality of inputs each connected to a respective one of the first mentioned bistable devices for receiving a signal when the first mentioned bistable device is set into the first state, and having its output connected to supply a signal for setting the further bistable device into the said other of its states.

In an embodiment of the invention, the system is arranged for checking the correct functioning of the sequences of operations in a high speed line printer having a plurality of printing hammers each capable of being activated in response to operation of associated controlling means to cause a character in a line of characters to be printed on a suitable medium, there being one of the first mentioned bistable devices associated with each printing hammer, the said first means being activated by the presence in a store of a character to be printed by a particular hammer so as to set the associated bistable device to the first state and the said second means being activated as a result of activation of the particular hammer. In such a case, the said fourth means may act in response to operation of the hammer controlling means associated with a hammer for which no character to be printed is present in the store.

Preferably, the system includes tenth means for setting the or each first mentioned bistable device to the second state before the associated sequence of operations starts.

A system incorporating the invention for checking the correct functioning of sequences of operations in a high speed line printer will now be described by way of example and with reference to the accompanying drawings in which.

Figure 1:
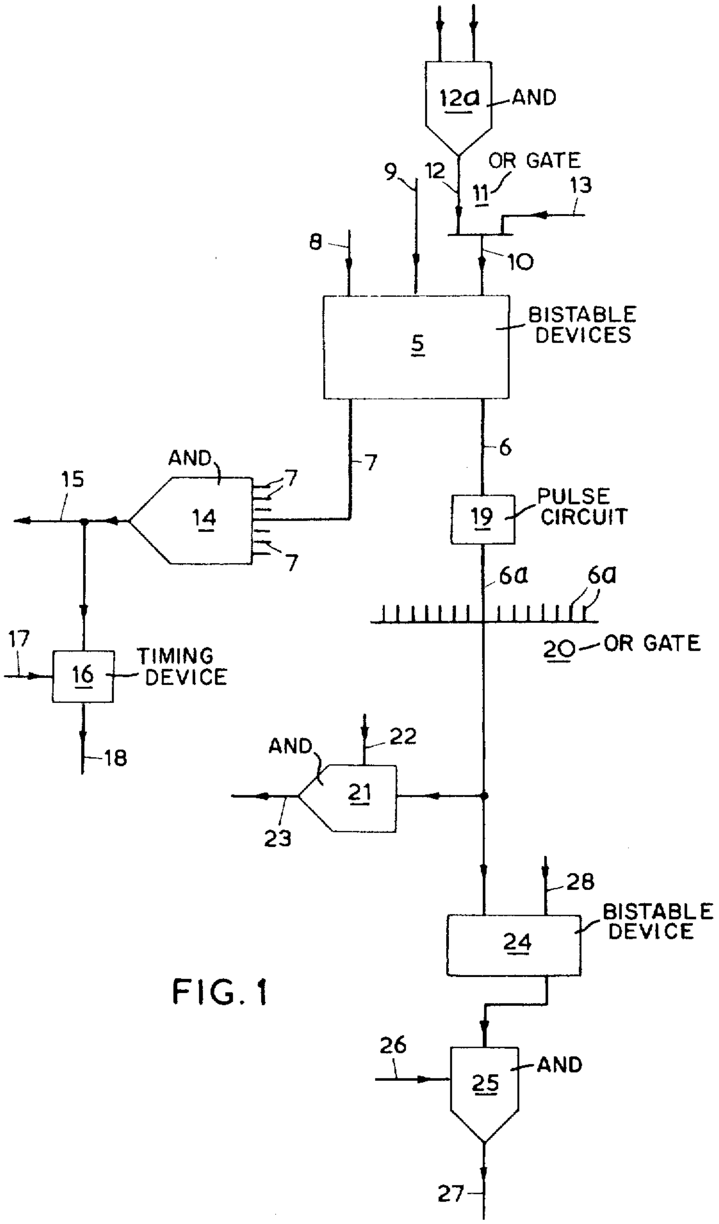
FIG. 1 shows a logic diagram of part of the system.

Before the system is described in detail, a brief description of the high speed printer in which it is incorporated will be given.

The printer has a continuously driven shaft on which lines of types are carried, the lines extending along the length of the shaft and being spaced apart circumferentially round the shaft. The types in any particular line are identical. A line of hammers, one for each type in a line of types, is arranged parallel to and under the shaft, and between the hammers and the shaft are arranged the paper on which printing is to take place and a printing ribbon as wide as the length of the lines of types.

The operation of the printer takes place in alternate "read" and "print" stages. When a line of alphanumeric characters represented by, for example, data stored on magnetic tape is to be printed, the printer control system causes the data to be read serially from the tape into a shift register and from thence it is stored in parallel fashion in a magnetic core store. The store has one storage location corresponding with each hammer. This process takes place during a read stage of the printer. Each printing hammer is controlled by an associated sense amplifier. Each sense amplifier is operated under the control of two signals, one signal denoting which particular line of types is instantaneously positioned in alignment with the hammers, and the other signal denoting the character represented by the data stored in the corresponding location in the core store. When, during the print stage of the printer, immediately following the above mentioned read stage, one or more types in particular positions in the line of types aligned with the hammers correspond with the characters stored in the corresponding locations in the core store, then sense amplifiers will be operated to cause the associated hammers to be actuated to print the characters on the paper. When the rotating shaft has presented the next line of types to the hammers, the process is repeated and one or more other hammers may be actuated. Repetition of the process continues until all the characters stored in the core store have been printed. The print stage then ends and the paper is stepped on to enable the next line of characters to be printed following the next read stage. It will be appreciated that printing of a line of characters will be completed in the time taken for the shaft to rotate one, or less than one, revolution.

The operation of the printer may be considered to be composed of several sequences of operation, one such sequence occurring for each storage location and associated sense amplifier and hammer. The sequences do not occur simultaneously, nor is one sequence completed before the next starts. The first operation in each sequence is the feeding of data into the storage location; the final step is the operation of the printing hammer to print a character. If the data fed into the storage location does not represent a character to be printed, then unless there is a fault, the sequence will not include the operation of the printing hammer. The checking system to be described checks the correctness of each sequence of operation and indicates when all the sequences have been completed.

The checking system will now be described, firstly with reference to FIG. 1. The checking system includes a plurality of bistable devices 5, one associated with each location in the core store and thus with each printing hammer, only one being illustrated in the figure. Each bistable device may be set in a SET state in which it provides an ON output on a line 6 and an OFF output on a line 7, and a RESET state in which it provides an ON output on line 7 and an OFF output on line 6. The device 5 is controlled by three inputs: firstly, a reset input on line 8 is controlled by a manually operable push button (not shown) and sets the device to the RESET state; secondly, an input on the line 9 triggers the device 5, that is, switches it to the opposite stable state, this input being produced when the hammer associated with the particular device 5 is actuated; and thirdly, a set input on the line 10 sets the device to the SET state, this input being produced from an OR gate 11 having two inputs on lines 12 and 13 respectively. The input on the line 12 is produced from an AND gate 12*a* which receives two inputs; one input to the AND gate is produced, during each read stage, when the shift register in the printer has transferred data representing a character to be printed from the magnetic tape into the location in the core store associated with the particular device 5, and the other input is a clock pulse occurring at a predetermined time to ensure that the device 5 is set at the correct time during each read stage. The input on the line 13 is produced during each print stage when a sense amplifier is operated preparatory to actuation of a printing hammer.

The line 7 is connected to the input of an AND gate 14, the lines 7 of the bistable devices 5 associated with the other printing hammers are connected to the other inputs of the AND gate 14. When all the inputs to the AND gate 14 are ON, that is, when all the devices 5 are in the RESET state, the AND gate produces an output on the line 15. This output is also fed to a timing device 16. The timing device 16 is set in operation at the beginning of each print stage by a signal on a line 17 and, at the end of a period slightly longer than the time taken for the type-carrying shaft to complete one revolution, produces an output on the line 18 unless previously inhibited by receipt of the output from the AND gate 14.

The line 6 is connected to a pulse circuit 19 which, when it receives an ON signal on the line 6, produces a pulse signal which exists for a predetermined short length of time less than the length of the read or the print stage. The output of the pulse circuit is applied to an OR gate 20, by means of a line 6*a*, as are the outputs of the pulse circuits associated with all the other bistable devices 5. When one or more lines 6 carry an ON signal, the OR gate 20 produces an output on a line 6*b* which is fed to an AND gate 21 which also receives an input on a line 22 during each print stage. When the AND gate 21 receives both input signals simultaneously it produces an output on the line 23. The output from the OR gate 20 is also fed to a bistable device 24 settable in a SET state and a RESET state and sets the latter to its RESET state. The bistable device 24 produces an output when in the SET state which is passed to an AND gate 25. The bistable device 24 is set to the SET state by signals on a line 28 which occur regularly during each read stage. The AND gate 25 receives a further input on the line 26 which occurs each time the data being fed into a core store position represents a character to be printed. If the data being transferred represents, for example, a space between two words, then the input on the line 26 is not present.

Figure 3:
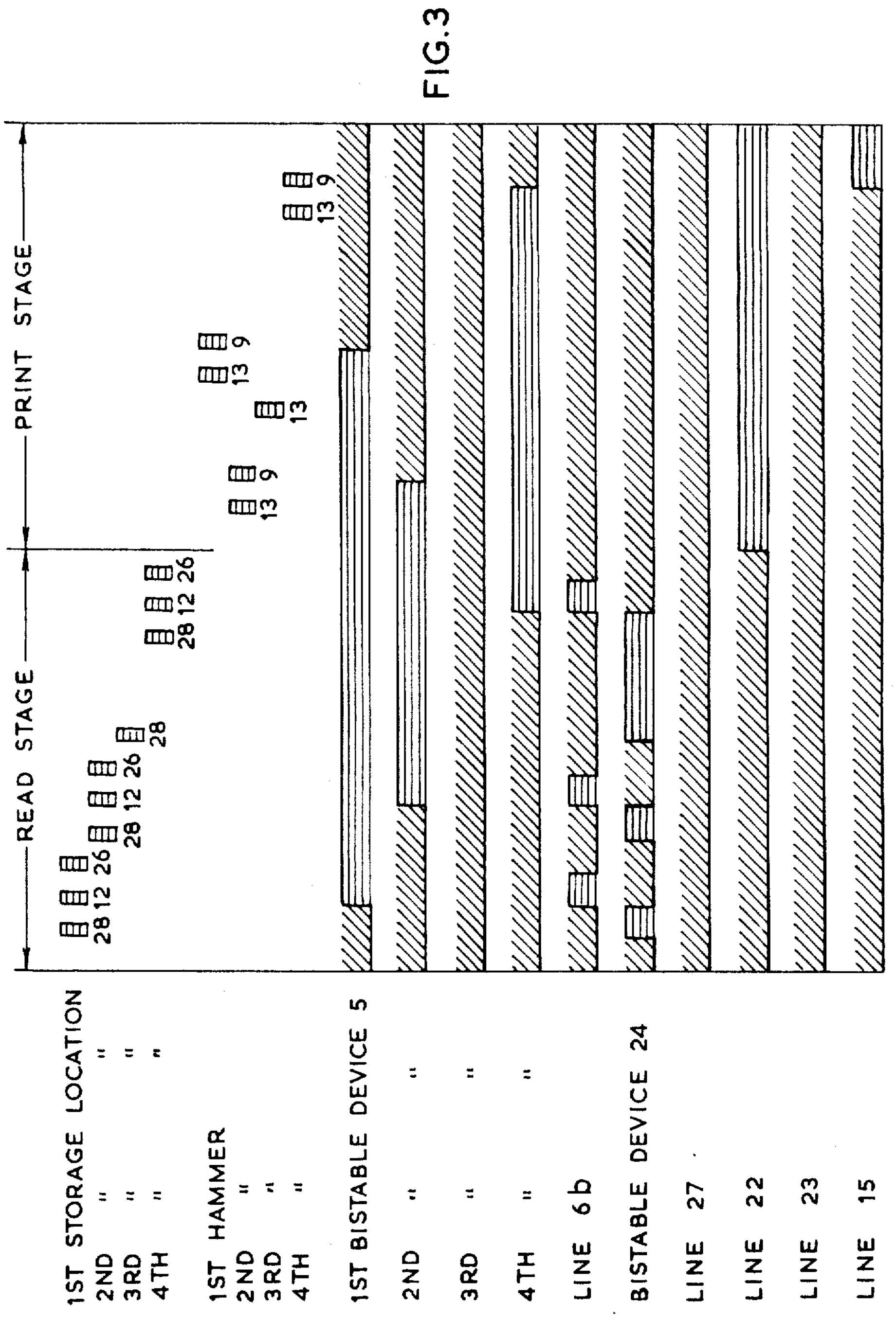
FIG. 3 shows pulses and signals occurring in the system under fault-free conditions.
Figure 4:
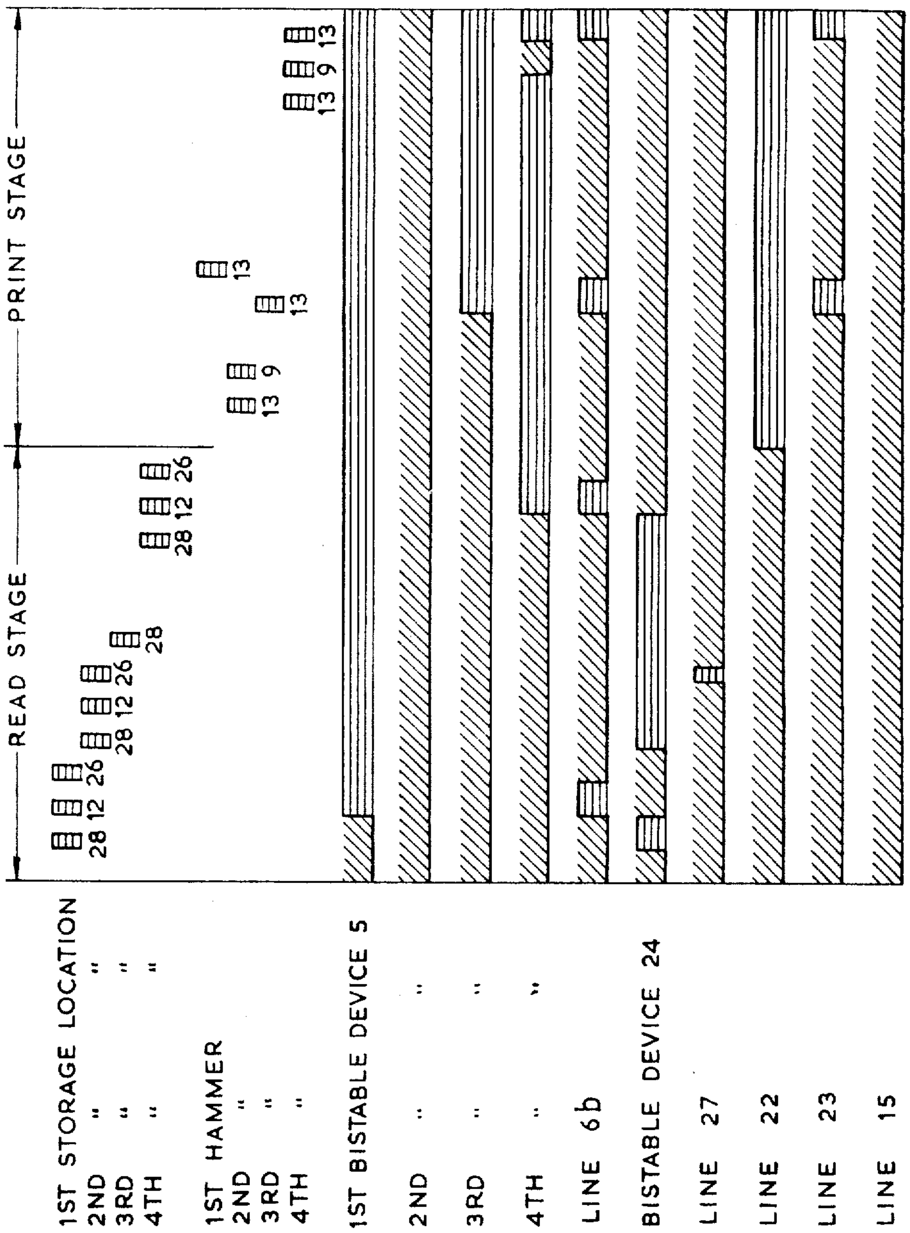
FIG. 4 shows pulses and signals occurring in the system when certain faults in the printer operation occur.

Before describing the electrical circuit of the system with reference of FIG. 2, the operation of the system will first be described with the aid of FIGS. 3 and 4 which show pulses occurring at various points in the circuit at different times. For simplicity there have been assumed to be only four core storage locations, each having an associated bistable device 5 and a printing hammer. In practice, of course, there would be many more printing hammers since the number of printing hammers determines the number of characters that can be printed in a line, and an equal number of core storage locations and bistable devices 5. In FIGS. 3 and 4, the presence of a signal on a line, or the existence of the SET state in a bistable device, is indicated by horizontal hatching, while the absence of a signal on a line, or the existence of the RESET state in a bistable device, is indicated by diagonal hatching. Where necessary, pulses are identified by the reference of the lines on which they occur.

It will be assumed initially that the printer is operating correctly. During a read stage, the shift register passes data serially into the storage locations. The data may represent a character to be printed by the hammer associated with the storage location or it may represent, say, a space between two characters. As the data is fed into each storage location a signal is produced on the line 28 (see FIG. 1) as shown in FIG. 3. If the data fed into the storage location represents a character to be printed then one of the inputs to the AND gate 12*a* is produced and, immediately following, the other input to the AND gate, a clock pulse, occurs causing the AND gate to produce a signal on the line 12. FIG. 3 shows this latter signal occurring immediately after the signal on line 28 as data is fed into the 1st, 2nd, and 4th storage locations. It is assumed that the data fed into the 3rd storage location does not represent a character to be printed and therefore no signal is produced on the line 12 as data is fed into this storage location. The signal on the line 26 follows each signal on the line 12 and only occurs if the data fed into the storage location represents a character to be printed; thus no signal on the line 26 occurs when data is fed into the 3rd storage location.

Each storage location controls a respective bistable device 5. All the bistable devices 5 are initially set to the RESET state by means not shown. The 1st, 2nd and 4th bistable devices 5 are set to the SET states by the signals on the lines 12; the 3rd bistable device remains in the RESET state because no signal on the line 12 is produced when data is fed into the 3rd storage location.

The setting of the 1st, 2nd and 4th bistable devices 5 into the SET state causes ON outputs to be produced on their lines 6 and OFF outputs on their lines 7. The ON outputs on the lines 6 cause the respective pulse circuits 19 to produce pulses on the lines *6a* which last for a predetermined short period. These pulses produce signals on line *6b* (see FIG. 1) and are shown in FIG. 3. As the 3rd bistable device remains in the RESET state, it does not cause production of a signal on the line *6b*.

Each signal on the line 28 causes the bistable device 24 to be set into the SET state: each signal on the line *6b* sets the bistable device 24 back to the RESET state. FIG. 3 shows the operation of the bistable device 24 during the read stage. When the bistable device 24 is in the SET state, it produces a signal on one of the inputs of AND gate 25, the other input to the AND gate is supplied on the line 26. Signals on the lines 26 occur, as already explained, each time data representing a character to be printed is fed into a storage location. Reference to FIG. 3 will show that at each time when a signal on the line 26 appears, the bistable device 24 has been set to the RESET state and therefore no output on the line 27 is produced.

The signal on the line 22 does not occur during the read stage so no output is produced on the line 23.

The print stage immediately follows the read stage. During the print stage, the data in each storage location representing a character to be printed is continuously compared with the actual type positioned by the printer shaft in alignment with the corresponding printing hammer. When the type and the character to be printed are the same, the sense amplifier controlling the hammer is immediately activated, causing a signal on the line 13 connected to the associated bistable device 5 to be produced, and then the hammer is activated to complete the actual printing operation. As the hammer operates, a signal on the line 9 connected to the associated bistable device 5 is produced. FIG. 3 shows the signals on the lines 9 and 13 which are produced as the 1st, 2nd and 4th hammers (associated with the 1st, 2nd and 4th storage locations) are operated. It should be noted that the hammers are not necessarily operated in order: each hammer is operated as soon as the character in the corresponding storage location and the type in alignment with the hammer are the same. The 3rd hammer does not operate as the 3rd storage location does not contain a character to be printed.

FIG. 3 shows that the signals on the lines 13 have no effect on the bistable devices 5. The action of these signals is to set the devices 5 into the SET state, but as the devices are already in that state, no change takes place. Each signal on the lines 9, however, triggers the bistable devices 5 from the SET state to the RESET state and when all the 1st, 2nd and 4th hammers have operated, all the bistable devices 5 are in the RESET state. All the inputs to the AND gate 14 are therefore ON and an output is produced on the line 15, as shown in FIG. 3. This output signifies that all characters to be printed have been printed, and may be used to step on the paper automatically to permit the printing of the next line of printing to be initiated. The signal on the line 15 is also applied to the timing unit 16 and will stop its operation, inhibiting generation of the signal on the line 18.

The operation of the checking system under certain fault conditions will now be considered. FIG. 4 illustrates the pulses and signals occurring in the system when the faults to be described occur. As a first example, it will be assumed that, due to a fault in the printing hammer mechanism or in a sense amplifier, one of the hammers, say, the 1st hammer, does not operate to print a character stored in the corresponding storage location. Therefore, the 1st bistable device 5, which was initially set to the SET state by a signal on the line 10, will not be triggered to the RESET state but will remain in the SET state. Hence, one of the inputs to the AND gate 14 will remain in the OFF state and no output will be produced on the line 15. The timing unit 16 will therefore not be stopped and, at the end of its timed period, will produce an output on the line 18. This output will produce a warning indication indicating that a character which should be printed has not been printed. The output will also allow the paper to be stepped on and the cycle of operations of the printer to be repeated—that is, the printer will not be automatically stopped immediately because of this one fault, but can be arranged to stop automatically at the end of the line of printing, or alternatively after completion of several lines of printing constituting a page, in order that the fault can be rectified.

Under such a fault condition, the operation of the bistable device 24 and the AND gate 25, as well as the AND gate 21, is exactly similar to that explained above and these two AND gates will not produce output signals.

As a second example, it will be assumed that a fault, for example pick-up, causes the sense amplifier associated with the 3rd printing hammer, which is not required for printing during a print stage because the corresponding storage location does not contain a character to be printed, to be activated during the print stage. Such a fault produces a signal on one of the lines 13 which sets the 3*rd* bistable device 5 to the SET state. It will be appreciated that this bistable device, in the absence of the fault condition being described, remains in the RESET state throughout the read and print stages (see FIG. 3). As one bistable device 5 is in the SET state during the print stage, the device 19 produces a pulse and provides an input on line *6b* to the AND gate 21. When the AND gate 21 receives its other input on the line 22 during the print stage, it produces a warning indication on the line 23. The fact that the 3rd bistable device 5 is set to the SET state during the print stage will not cause the AND gate 25 to produce an output because the signals on the line 26 are only received during the read stage.

A third example of a fault will now be considered: it will be assumed that a fault in, say, the 2nd bistable device 5 has prevented that bistable device from being set to the SET state during the read stage even though the character transferred into the 2nd storage location is a character to be printed. As the 2nd device 5 is not set to the SET state, device 19 will not produce a corresponding pulse on the line *6a* and there will be no corresponding pulse on line *6b*. Therefore, device 24, which will be set to the SET state by the signal received on the line 28, remains in the SET state until the next pulse on the line *6b* occurs. When the next signal on the line 26 is received, the device 24 is still set and consequently the AND gate 25 produces an output on the line 27 indicating that one of the bistable devices 5 has failed to operate correctly.

A fourth example of a fault will now be considered; it will be assumed that a sense amplifier, or the associated hammer, operates inadvertently after it has already operated correctly. In this case, the associated bistable device 5 will be set and a warning signal will be produced on line 22. FIG. 4 illustrates this type of fault, the sense amplifier associated with the 4th hammer being assumed to have operated inadvertently after operating correctly.

The four faults described may occur separately or at the same time: in both cases, correct fault indication is given by the checking system. FIG. 4 shows the pulses and signals occurring in the system when all four faults described above exist together.

Figure 2:
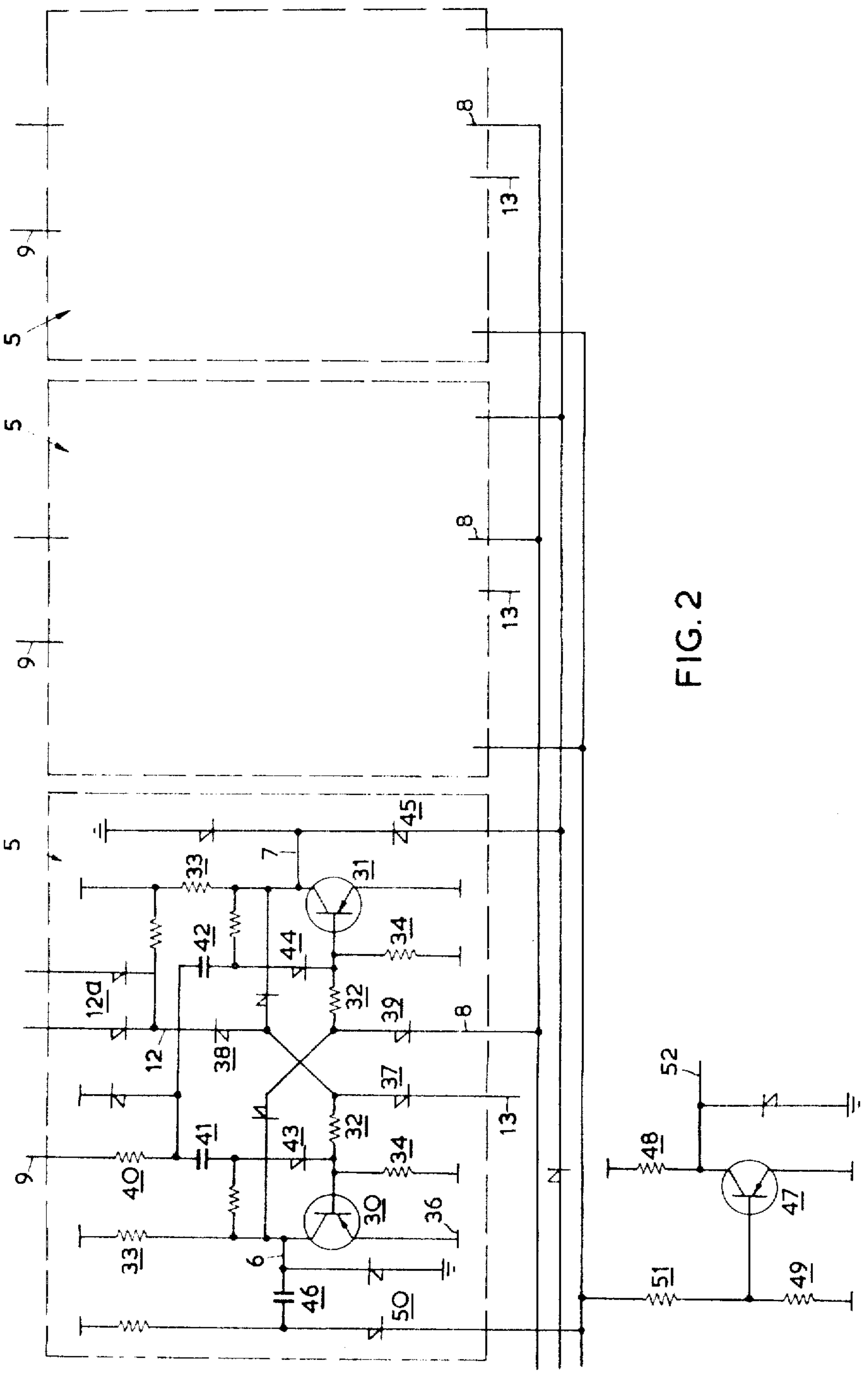
FIG. 2 shows an electrical circuit diagram of the system of FIG. 1.

FIG. 2 shows an electrical circuit of the checking system of FIG. 1. The circuit illustrated shows one of the bistable devices 5 enclosed in dotted lines; two other bistable devices 5 are represented by further dotted lines. In practice of course, there are many more of the bistable devices 5, in fact one for each printing hammer and corresponding core storage location as explained. Also enclosed in the dotted lines is the OR gate 11 associated with each bistable device 5 as well as individual component parts of the AND gate 14. Lines in FIG. 2 equivalent to lines on the logic diagram on FIG. 1 have the same references as in FIG. 1.

Each bistable device 5 comprises two transistors 30 and 31 interconnected through resistors 32 to form a bistable flip-flop circuit. Each transistor has its collector and base connected to the respective poles of a voltage source (not shown) through resistors 33 and 34, and its emitter directly connected to the voltage source. The symbol indicated by the reference 36 represents a connection to the voltage source. Each bistable circuit may be set to the SET state by signals on the lines 12 and 13, the diodes 37 and 38 representing the OR gate 10. In this state, transistor 30 conducts and transistor 31 does not conduct.

Each bistable circuit may be set to the RESET state by a signal on the line 8 through a diode 39. In this state, transistor 31 conducts and transistor 30 does not conduct. Each bistable circuit may be triggered to a state opposite to that which exists at any time by a signal on the line 9 which is connected to the respective bases of the transistors 30 and 31 through resistor 40, capacitors 41 and 42 and diodes 43 and 44. When a bistable circuit is in the RESET state, transistor 31 is conducting and an ON signal is produced on the line 7, the diodes 45 in each bistable circuit together constituting the AND gate 14. When the bistable circuit is in the SET state, transistor 30 is conducting and an ON output is produced on the line 6. This output is passed through a timing capacitor 46 which is part of the pulse circuit 19, the latter comprising a transistor 47 having its base and collector electrodes connected to the voltage source through resistors 48 and 49, each capacitor 46 being connected to the transistor 47 through a diode 50, constituting part of the OR gate 20, and a resistor 51. The output of the pulse circuit 19 for connection to the AND gate 21 and the bistable device 24 (FIG. 1) is taken from a line 52.

What I claim as my invention and desired to secure by Letters Patent is:

1. A printer having:

a plurality of print hammers with respective firing means;

a character bearing member movable past said hammers;

a memory for storing, for each hammer, data indicative of the character to be printed in a position corresponding to the hammer;

write means for writing said data into the memory;

read means for reading out said data from the memory and operating the firing means in accordance with said data; and checking means including a separate flip-flop for each hammer;

means effective during the operation of the write means for setting each flip-flop true if the corresponding data represents a character to be printed;

means for changing the state of each flip-flop in response to the operation of the corresponding firing means; and error indication means for indicating an error in response to any flip-flop changing to the true state during the operation of the read means.

2. A printer according to claim 1 and including:

logical product means fed from all flip-flops for indicating the completion of printing when all flip-flops are false.

3. A printer according to claim 2 and including:

timing circuit means arranged to be energized when the read means starts to operate, for producing a signal indicative of error after a predetermined time which is in excess of the maximum time required to complete printing; and means fed by the output of the logical product means for inhibiting the production of said signal.

4. A printer according to claim 1 wherein the write means writes the data for each hammer in turn into the memory, and including:

an additional flip-flop;

means for setting said additional flip-flop true in response to the writing of data in the memory by the write means;

means for setting said additional flip-flop in response to the setting of any of said flip-flops true during the operation of the write means; and means for indicating an error in writing said data into the memory if data representing a character to be printed is written into the memory and said additional flip-flop is not set true.

References Cited

UNITED STATES PATENTS

| | | | |
|---|---|---|---|
| 3,066,601 | 12/1942 | Eden | 101—93 |
| 3,140,470 | 7/1964 | Deerfield | 340—172.5 |
| 3,167,002 | 1/1965 | Kaneda et al. | 101—93 |
| 3,222,651 | 12/1965 | Fabiszewski et al. | 340—172.5 |

ROBERT C. BAILEY, *Primary Examiner.*

R. M. RICKERT, *Assistant Examiner.*